US012541941B2

United States Patent
Novotny et al.

(10) Patent No.: US 12,541,941 B2
(45) Date of Patent: Feb. 3, 2026

(54) METHOD FOR TESTING AN EMBEDDED SYSTEM OF A DEVICE, A METHOD FOR IDENTIFYING A STATE OF THE DEVICE AND A SYSTEM FOR THESE METHODS

(71) Applicant: Y Soft Corporation A.S., Brno (CZ)

(72) Inventors: Vaclav Novotny, Brno (CZ); Ales Pernikar, Brno (CZ); Barbora Perinova, Brno (CZ); Jiri Kyzlink, Brno (CZ); Jakub Pavlak, Brno (CZ); Ondrej Krajicek, Brno (CZ)

(73) Assignee: Y Soft Corporation A.S., Brno (CZ)

( * ) Notice: Subject to any disclaimer, the term of this patent is extended or adjusted under 35 U.S.C. 154(b) by 367 days.

(21) Appl. No.: 18/007,104

(22) PCT Filed: Jul. 27, 2020

(86) PCT No.: PCT/CZ2020/050052
§ 371 (c)(1),
(2) Date: Jan. 27, 2023

(87) PCT Pub. No.: WO2022/022757
PCT Pub. Date: Feb. 3, 2022

(65) Prior Publication Data
US 2023/0230337 A1    Jul. 20, 2023

(51) Int. Cl.
*G06V 30/414* (2022.01)
*G06V 10/25* (2022.01)
*G06V 10/72* (2022.01)

(52) U.S. Cl.
CPC .............. *G06V 10/25* (2022.01); *G06V 10/72* (2022.01); *G06V 30/414* (2022.01)

(58) Field of Classification Search
CPC ...... G06V 10/25; G06V 10/72; G06V 30/414; G06V 20/10; G06V 30/418
See application file for complete search history.

(56) References Cited

U.S. PATENT DOCUMENTS

2018/0113774 A1* 4/2018 Kyzlink ............. G01R 31/2834

FOREIGN PATENT DOCUMENTS

| CN | 106097322 A | 11/2016 |
|---|---|---|
| CN | 206711077 U | 12/2017 |
| CN | 109840508 A | 6/2019 |
| EP | 3093767 A1 | 11/2016 |

(Continued)

OTHER PUBLICATIONS

Fang, Xiaoxin, et al. "Automatic GUI test by using SIFT matching." China Communications 13.9 (2016): 227-236. (Year: 2016).*

(Continued)

*Primary Examiner* — Siamak Harandi
*Assistant Examiner* — Denise G Alfonso
(74) *Attorney, Agent, or Firm* — Thedford I. Hitaffer; Hitaffer PLLC (57) ABSTRACT

A method of testing an embedded system of the device using a testing robot, a central control unit and a device under test. The device under test may be in different states, wherein the states are determined using the testing robot with a visual sensor. After the state of the device is determined, the testing robot interacts with the device under test and changes its state to a new state.

13 Claims, 6 Drawing Sheets

(56) References Cited

FOREIGN PATENT DOCUMENTS

EP          3529626        8/2019
WO      2018146374 A1     8/2018

OTHER PUBLICATIONS

Tiwari, Ashwani Kumar, Vivek Kanhangad, and Ram Bilas Pachori. "Histogram refinement for texture descriptor based image retrieval." Signal Processing: Image Communication 53 (2017): 73-85. (Year: 2017).*
Huang, Di, et al. "HSOG: a novel local image descriptor based on histograms of the second-order gradients." IEEE Transactions on Image Processing 23.11 (2014): 4680-4695. (Year: 2014).*
European Patent Office, International Searching Authority, International Search Report, dated Mar. 31, 2021, in International Application No. PCT/CZ2017/050052, filing date Jul. 27, 2020.
European Patent Office, International Searching Authority, Written Opinion, dated Mar. 31, 2021, in International Application No. PCT/CZ2017/050052, filing date Jul. 27, 2020.
Tsung-Hsiang Chang et al: 11 GUI testing using computer vision 11, CHI 2010 >Input, Security, and Privacy Policies, ACM, Atlanta, GA, USA, Apr. 10, 2010 (Apr. 10, 2010), pp. 1535-1544, XP058405116, DOI: 10.1145/1753326.1753555ISBN: 978-1-60558-929-9.

\* cited by examiner

METHOD FOR TESTING AN EMBEDDED SYSTEM OF A DEVICE, A METHOD FOR IDENTIFYING A STATE OF THE DEVICE AND A SYSTEM FOR THESE METHODS

CROSS-REFERENCE TO RELATED APPLICATION

This application, filed under 35 USC 371, is a United States National Stage Application of International Application No. PCT/CZ2020/050052, filed Jul. 27, 2020, the disclosure of which is incorporated herein by reference in its entirety.

TECHNICAL FIELD

Automatic testing of user interfaces and embedded systems using a robot with image processing unit using a neural network.

BACKGROUND OF THE INVENTION

Many electronic devices comprise a so-called embedded system. This system comprises a hardware unit similar to classical computer with a smaller computing power, and a display together with a set of controlling buttons or similar devices. Embedded systems are used to control an electronic device the usage of which is a little more complicated and require advanced user input. Usually, the embedded system can be found in printers, calculators, ATMs, various control systems in industrial areas etc.

With the rapid process in almost every technological field, embedded systems have been spreading quickly too. As the consumer can buy almost any of the electronic domestic devices in the "smart" form and connect them in the network of internet of things (IoT), control units for these systems are needed as well.

To make the operations easier, the embedded systems usually have a user interface, such as touch display, or display with a set of controlling buttons. To lower its cost, the embedded system runs only a single program or application which is developed to serve a specific purpose, such as operating a printer or any device it is ran onto. As any other software, the program ran on the embedded system is developed by a team of developers to eliminate all the bugs and defects and to ensure that everything runs smoothly when the final product is delivered to the customer. However, sometimes only a slight change in the code of the embedded system background can lead to creation of bugs or unpredictable behavior of the UI software, such as crashing. Therefore, thorough testing of the embedded system is recommended after every change in the embedded system backend. The embedded system can be implemented on many devices of the same kind. These, however, vary by their producer and models. It is clear, that for carrying out the same task, the device by producer A will require a different set of steps than the device by producer B, and even the graphical side of the user interface will be different. All these factors increase the difficulty of smooth testing of the embedded systems and a situation may arise when a change in the embedded system backend must be manually checked numerous times on dozens of devices by a single person, as single testing can provide different results than testing a device a hundred times.

For the purpose of testing devices like these, various methods have been developed. Commonly, these methods are carried out by a robot with an effector, a visual system and a computing unit, wherein the robot is connected to a computer network, as can be seen from e.g. WO2018146374 A1. Additionally, the robot can comprise its own UI, a set of sensors to monitor various parameters of the tested device. Visual system comprises a camera to make images of the tested system and an image processing unit adapted to process the image captured by the camera. Via processing, the relationship between the robot effector and display of the device as well as the information displayed on the display are determined.

Another document describing the state of the art is CN 109840508 Robot vision control method and device based on deep network architecture automatic search and storage medium. This patent application teaches a vision control method for a robot. The vision control method uses a neural network to enhance the processing of the images obtained via a sensor (camera) and leads to better precision in calculating the positional relationship between a target and robot's mechanical arm used to control the target. The system can automatically configure the deep neural network based on the needs of the user and deploy the deep neural network in the robot's vision system, so that the user can utilize the system to realize some personalized needs. Besides teaching a robot with vision system enhanced by the neural network, the image processing for a better recognition of the UI or an information shown by display using a neural network is not further discussed. Similarly, the document CN 106097322 B teaches a test robot with visual system. The visual system of the robot is calibrated using neural networks. As a result, the respective position of the robot effector and the tested device is determined with higher accuracy and speed.

Various test methods often use a private network, consisting of a central computer ran by the operator, from which the whole system is operated. Such a system is described for example in the U.S. Pat. No. 10,223,248 B2 Conducting automated software testing using centralized controller and distributed test host server. This document describes a computer network operated by a central computer connected to a plurality of test host servers. Each server receives a test represented by a set of instructions which is then executed by the test server to test a feature of a program or a device. After the test is done, results are sent back to the operating computer. Similar method of cloud-based testing is presented in the U.S. Pat. No. 8,839,035 B1.

Method, apparatus, and a computer program for a testing apparatus are presented in the application WO 2018 146374. This document presents a complex system for testing a functionality of devices like smartphones or tablets. The apparatus comprises a robot equipped with a gripping head for gripping a test device. Robot further comprises a movement detection sensor to establish a positional relationship between the tested device and a robot. The testing apparatus is, however, mainly used to test the functionality of the tested device, e.g. the device can be turned on/off, the display is reacting correctly, the light source of the device is functional etc. The testing apparatus according to this document cannot be implemented for repetitive testing of a software feature.

Another document representing the state of the art is the U.S. Pat. No. 9,787,978. The patent for Display invention teaches a device for testing a display. The device comprises an image sensor adapted to capture the image and calculate the orientation of the display with respect to the image sensor. Therefore, this device solves the problem of incorrect display reading caused by unusual orientation of the display.

Further, the patent application EP 3093767 A1 teaches an apparatus for testing a display of touch displays. The application suggests testing various gestures, multiple inputs and a response of the touch display.

Even though there are applications and patent documents teaching a test device with a robot for testing said device, the problem still remains, how to correctly process the image captured by robot's vision system. Currently, positional relationship between the robot and the tested device is determined with the aid of neural networks. Image processing is, however, heavily influenced by various conditions—light intensity, image sharpness reduction caused by floor vibrations, display settings—intensity of the display, color contrast. Various display or camera defects can also be present, such as dead pixels. Even the position or rotation of the display is not always permanent, and each change of position or rotations requires the camera to be calibrated. Furthermore, various orientations of the camera or display may lead to differently oriented images which may be harder to process. Since it is almost impossible to maintain constant conditions for the whole duration of testing of the tested device, the images captured by the imaging unit may vary in their quality and relative information they carry. This could then lead to longer processing and testing, or defects, such as test crash.

A common problem with testing user interfaces using robots with visual recognition systems lies in processing the image. Response time of the embedded system is usually measured to determine fluency of the user interface. However, as the processing and recognition of the screen of the user interface takes a long time, in the matter of seconds, measuring of the response time can be very difficult, and measuring of the system response time is thus distorted by a high statistical error.

It is thus an object of the present invention to provide solution to the problems described above.

SUMMARY OF THE INVENTION

The aforementioned problems are at least partially solved by a method for testing an embedded system of a device. The method comprises the following steps:
 Creating a set of images depicting at least two different states of an observable user interface (OUI) of the device under test. The images are stored in a memory unit of a central control unit,
 Assigning at least one action element or button to at least one image of the state of the OUI,
 Assigning an identifying a descriptor to each image of the states of the OUI.

The previous steps precede the testing itself. However, they are necessary for the method as a whole. The next steps which are performed during the testing are the following:
 Acquiring an image of the OUI of the device under test by a testing robot,
 Assigning a current descriptor to the acquired image,
 Determining the current state of the OUI of the device under test using the identifying descriptors and the current descriptor,
 Hereby locating either an action element or a button if the current state of the device has any,
 Moving the effector of the testing robot to the action element or the button and interacting with the action element or the button.

This method provides quick, accurate and reliable method of testing embedded systems of various devices. Quickness is achieved by using descriptors which are a numerical representation of an image. It is thus possible to assign the acquired image to an identified state by using only the descriptors, rather than comparing the two images, which would need the same exact size of the images and very similar conditions of acquisition. The descriptors eliminate the need for an image to be acquired in similar conditions, as the descriptors of plurality of images of the OUI acquired in different conditions (e.g. lighting, distance of the camera from the OUI, focus, angle etc.) will always be similar, if they depict the same state of the device under test. One can determine the current state of the device under test (e.g. screen shown on the display) by comparing the current descriptor with identifying descriptors, which are assigned to the images of all possible states of the device under test. The images are manually assigned an action element or a button which is used for a user-device interaction. Assigning the action element or the button means specifying their location on the image and their purpose, e.g. a button might be used to confirm or cancel an action, turn the device on or shut it down, navigate through the GUI of the device under test etc. An action element is in the context of the application a button on a display embodied as a touchscreen.

The descriptors contain at least one set of numbers which represent a number of non-zero value pixels of the image which is in the binary edge format. Preferably, the image is divided into a number of sectors which can be groups of columns or rows of the image, wherein the number of sectors is equal to or larger than one and smaller than or equal to the corresponding dimension (width, height) of the image. For each of these sectors, the number of non-zero value pixels is counted, wherein these sets of numbers are added to the descriptor. The more sectors the image is divided to, the more accurate descriptor is obtained at the expense of time which is needed to identify and assign the current image to the identified ones.

The central control unit comprises a decision-making model which is adapted to determine the current state of the OUI using the identifying descriptors and the current descriptor. Preferably, the decision-making model is realized as a neural network. The neural network comprises a classifier learned on a dataset of the images of all possible states of the OUI and their identifying descriptors. The input of the decision-making model is the acquired image of the current state of the OUI or its descriptor and the output of the decision-making model is assignation of the current state of the device, or its OUI, to one of the stored states of the device under test. Thereby, the current state of the device under test is identified.

By interacting with the action element or the button, if the current state of the OUI has any, time measuring is initiated, and the state of the device is changed to a new state. After changing the state, the time measuring is stopped and then the new state is determined. As such, the presented method can thus be used to measure a response time of the device under test. By interacting with the action element or the button, if the current state of the OUI has any, an action may be performed, e.g. printing of a document. At this time, time measuring is initiated. When the completing of the action is detected by a sensor, the time measuring is stopped. The measured values can be then stored in the memory unit of the central control unit.

Following is a method of identifying a state of the device which comprises a step of capturing an image of the OUI by an image sensor. The image is then converted to a binary edge format, divided into a plurality of rows and columns, wherein for each of the plurality of the rows and columns a set of numbers representing a number of non-zero value pixels is created and assigned to an empty descriptor. The descriptor is then, together with the identifying descriptors, used to identify the current state of the OUI of the device under test. Next, the action element or the button can be located, if there is any for the current state of the device under test, and the effector is moved to the action element or the button and interacts with it.

Further, the image is divided into a number of sectors along at least one line, wherein the sectors are of the same size. The sectors are divided into groups containing a plurality of rows and/or columns and for each group, the first subset of numbers representing a number of non-zero value pixels in each row and the second subset of numbers representing a number of non-zero value pixels in each column is created and assigned to the current descriptor, thus increasing the accuracy of the descriptor. The dividing lines are either horizontal or vertical, wherein the number of groups is equal to or higher than one and smaller than or equal to a corresponding dimension of the image in pixels. The subsets of numbers creating the descriptors may be normalized so that the processing algorithm works with smaller numbers.

Both presented methods are carried out by a system for testing an embedded system of a device, the system comprising at least a device under test, a testing robot, and a central control unit. The device under test comprises at least an observable user interface adapted to show a state of the device under test and provided with at least one action element and/or a button and/or a visual indicator, the device under test further comprising an embedded system, wherein the action elements and buttons are adapted to interact with the embedded system. The central control unit comprises at least a memory unit comprising a database of images of all states of the OUI, wherein at least one of the states comprises an action element or a button with assigned function. The testing robot comprises at least an effector adapted for interacting with the device under test, a camera, and an image processing unit.

BRIEF DESCRIPTION OF THE DRAWINGS

The object of the present invention is further illustrated by means of examples of its implementation, which are described with the use of the accompanied drawings, in which.

EXEMPLARY EMBODIMENTS OF THE TECHNICAL SOLUTION

The object of the present invention is aimed primarily at testing embedded systems of various devices. Such systems are usually running on low-power computers implemented in the device, wherein interaction with the user is usually carried out by an observable user interface comprising a touchscreen or a display with buttons or other interactive elements, e.g. button, joystick, trackpad, mouse or keyboard.

Figure 1:
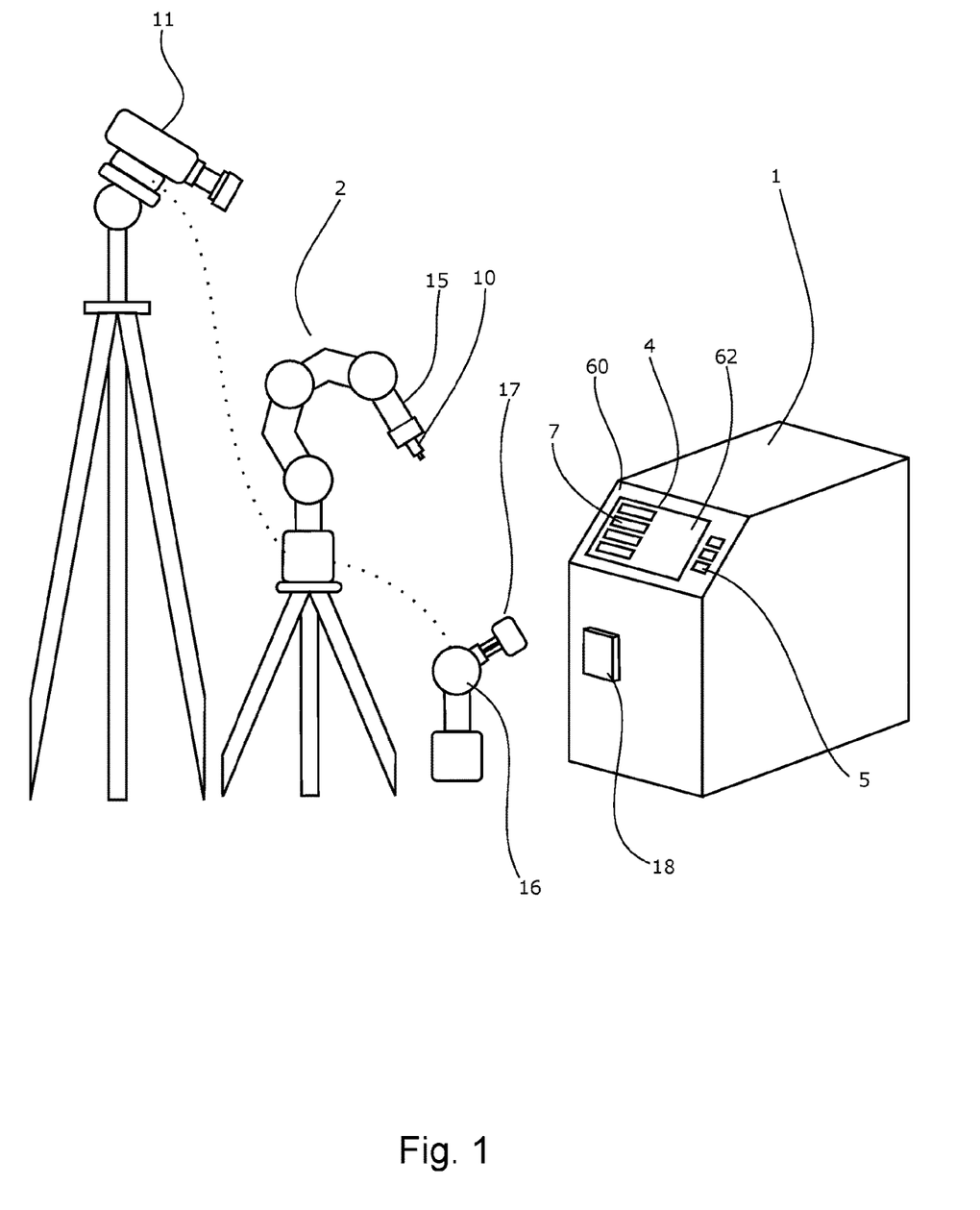
FIG. 1—schematically represents the system for testing an embedded system of a device.
Figure 2:
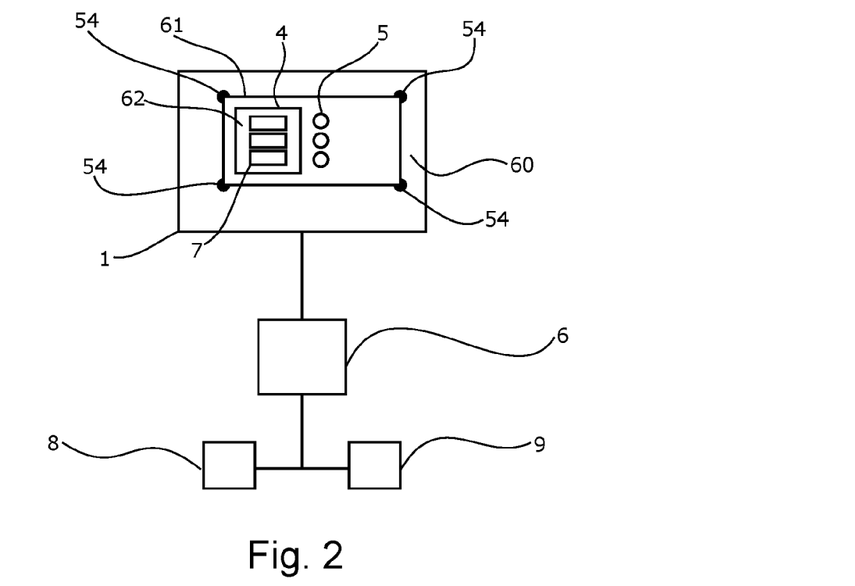
FIG. 2—shows an exemplary embodiment of the Observable User Interface of a device under test.
Figure 3:
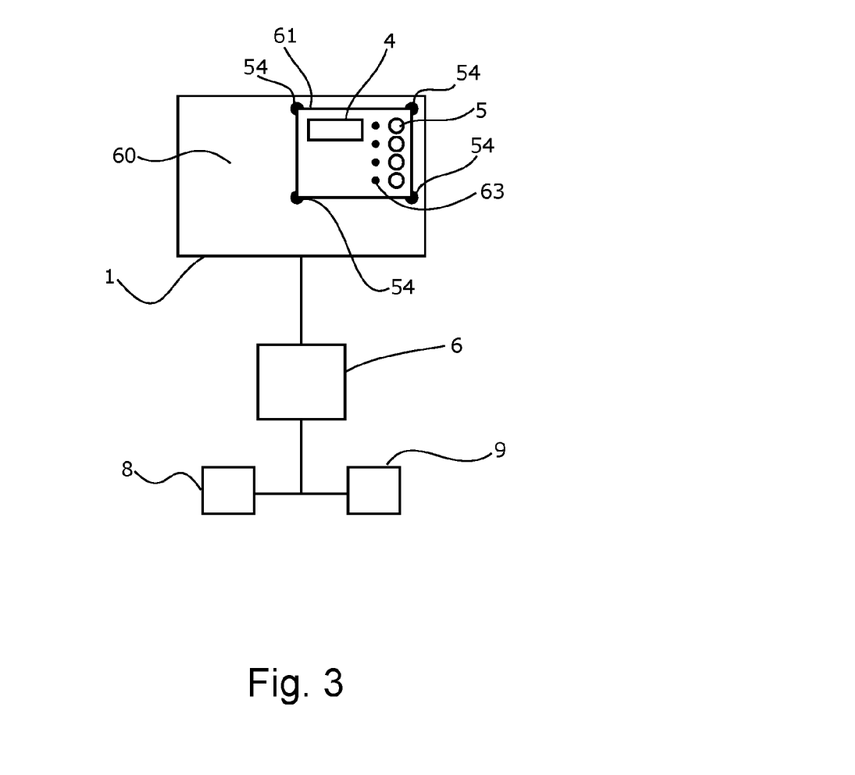
FIG. 3—shows an exemplary embodiment of the Observable User Interface of a device under test.
Figure 4A:
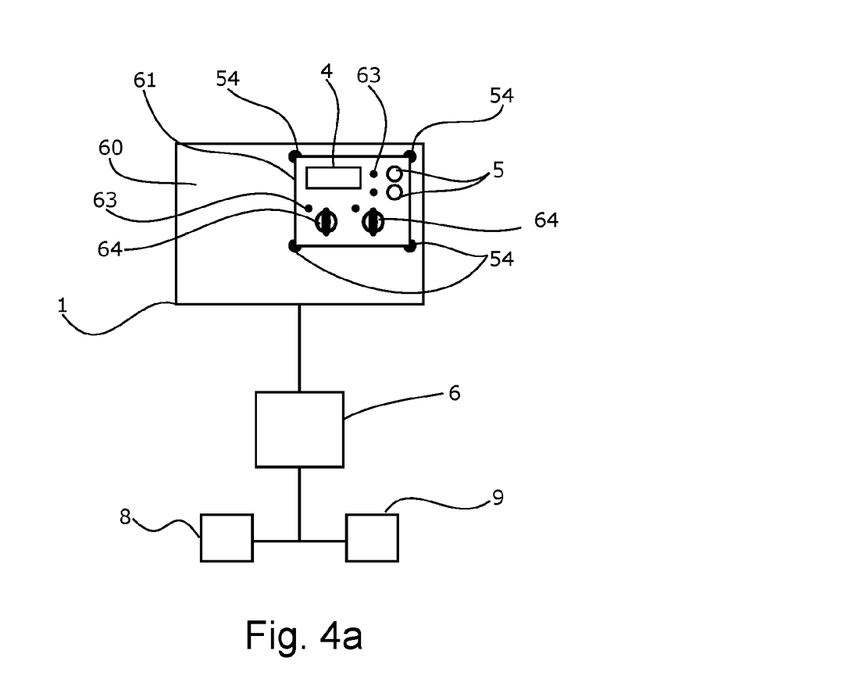
FIG. 4—shows two states of another exemplary embodiment of the Observable User Interface.
Figure 4B:
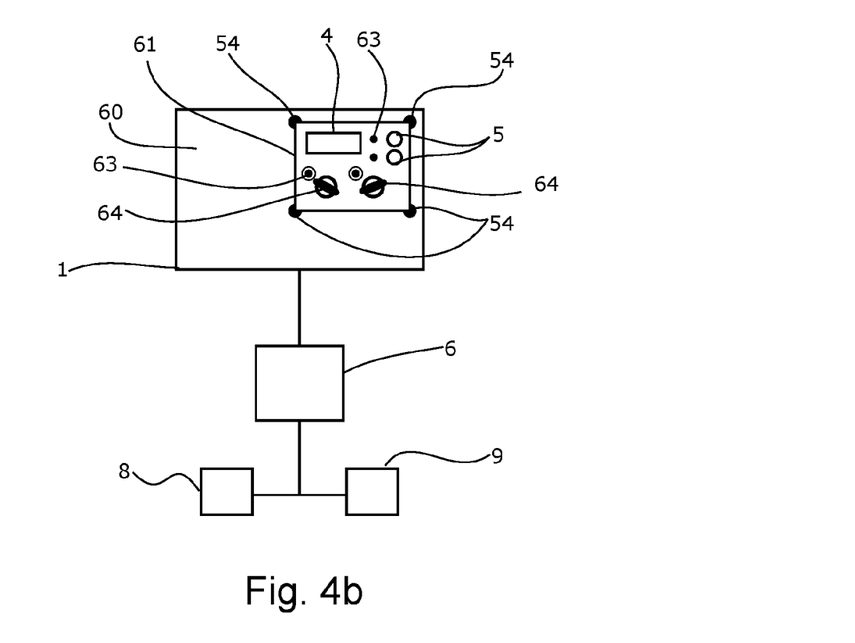

The system for testing an embedded system 6 of a device according to the exemplary embodiment of the present invention comprises a device 1 under test, a testing robot 2, and a central control unit 3 and is shown on the FIG. 1. The device 1 under test comprises at least an observable user interface 61 (OUI) adapted to show a state of the device 1 under test, see FIGS. 2 and 3. As can be seen on the FIGS. 1-4, the OUI 61 is provided with at least one button 5 and/or visual indicator 63. The button 5 is a physical device which is used for user-device interaction, as such it may be subjected to pressing, rotating, moving etc., wherein this movement is used to send instructions or requests to the embedded system 6 of the device 1 under test. The visual indicator 63 may be a LED or another light source and is used to identify the state of the device 1 under test. The state of the device 1 under test means whether it is turned off or on, which task is being realized, which option is selected etc. The settings and tasks performed by the device 1 under test are enabled and activated by the buttons 5 and with the help of the visual indicator 63. The device 1 under test may further comprise a display 4 used to provide visual feedback to the user, show time or other relevant information etc.

In yet another exemplary embodiment, the device 1 under test comprises a display 4 embodied preferably as a touchscreen, at least one button 5 and an embedded system 6. The display 4 is adapted to show screens of a Graphical User Interface 62 (GUI) of the embedded system 6. The screens of the GUI 62 may comprise a welcome screen, loading screen, shutdown screen, and other screens showing various functionalities, such as possible settings of the device 1 under test, list of selectable actions to be performed by the device 1 under test, error screens, menu screens etc. At least one screen then has at least one action element 7 which is preferably embodied as a button on the touchscreen of the device, this can be, e.g. a menu screen, which has several action elements 7, each of the action elements 7 can represent an option selectable form the menu screen. There can also be screens with no action elements 7, such as loading screen, which generally does not require any user action. The action element 7 itself may not have a physical form but can be implemented rather as an icon on the touchscreen of the display 4. Both the button 5 and the action element 7 are used to interact with the embedded system 6 and are assigned an action which may be different for the button 5 and the action element 7 and may vary from screen to screen. The action is performed upon interacting with the button 5 or the action element 7 wherein the interaction is in the exemplary embodiment performed by pressing the button 5 or touching (pressing) the action element 7. The action may then result into changing of the shown screen, or selecting a task from the list of tasks to be performed, cancelling an action, changing settings of the device 1 under test, logging in into the device or logging out etc. At least one screen has a connection to at least one other screen. Connection of the screens means that by performing an action on one screen, the display then shows another screen. Such connection may be presented by e.g. a screen with a list of possible tasks to be performed, each task being assigned an action element 7 wherein upon pressing the action element 7 the user is transferred into another screen showing more details about the selected task. Another example may be described by a screen showing a list of possible settings of the device 1 under test, each setting option being assigned an action element 7 wherein upon pressing the action element 7 or the button 5 the user is transferred into another screen associated with the selected setting. Some screens may not have a connection to another screen, such as the loading screen which does not require any user input and serves only as a transitional screen. For the device 1 under test to run the software of the embedded system smoothly, it is necessary for it to contain at least a processor 8 and a computational memory 9. In the exemplary embodiment, the device 1 under test is communicatively coupled to the central control unit 3. Communicative coupling can be realized either physically by a cable, such as ethernet cable or USB cable, or as a contactless coupling via Internet, Bluetooth, or by connecting it into a network. The communicative coupling, however, is not necessary and may not be implemented. In that case, the device 1 under test may act independently of the central control unit 3.

The testing robot 2, see FIG. 1, comprises at least an effector 10, a camera 11, a processor 12 with an image processing unit 13, and a memory unit 14. The effector 10 is adapted to move along at least two orthogonal axes, preferably three. In the exemplary embodiment, the effector 10 is attached to a first robot arm 15 which guides the movement of the effector 10. The effector 10 is used to simulate physical contact of the user with the display 4, buttons 5, and action elements 7. Should the display 4 be embodied as a touchscreen, the effector 10 is then adapted to interact with the display 4, e.g. by being made from a material which can interact with the touchscreen. In the exemplary embodiment, the camera 11 is placed on the testing robot 2 in such a way that it faces towards the display 4. Therefore, the display 4 and the buttons 5 are in the field of view of the camera 11 and the current screen shown on the display 4 is clearly seen by the camera 11. In yet another exemplary embodiment, the camera 11 is not placed on the testing robot 2, however, it is placed in such a way, that the display 4 and the buttons 5 are in the field of view of the camera 11. In this embodiment, the camera 11 can be placed, for example, on a tripod. The processor 12 of the testing robot 2 is adapted to control the actions of the testing robot 2 via software installed thereon. The actions of the testing robot 2 which the processor 12 controls include—controlling the movement of the first robot arm 15 and the effector 10, communicating with the central control unit 3, and operating the camera 11. The testing robot 2 is communicatively coupled to the central control unit 3. Communicative coupling can be realized either physically by a cable, such as ethernet cable or USB cable, or as a contactless coupling via Internet, Bluetooth, or by connecting it into a network.

In the exemplary embodiment on FIG. 1, the testing robot 2 further comprises a second robot arm 16 equipped with a communication tag 17, and the device 1 under test further comprises a communication receiver 18. The second robot arm 16 is then adapted to put the communication tag 17 near the communication receiver 18 when instructed by the processor 12. The communication tag 17 is preferably embodied as an RFID tag in a chip or a plastic card. In other embodiments, any communication tag 17 based on the RFID or NFC communication protocol may be used. Other forms of wireless communication or connection standards, such as BlueTooth, Infrared, WiFi, LPWAN, 3G, 4G, or 5G, are possible as well. The communication tag 17 includes an RFID chip which is activated when placed in the proximity of the communication receiver 18 which continually emits signal in a radio frequency spectrum. Upon activating the communication tag 17 an action in the device 1 under test can be performed. For example, a task to be performed by the device 1 under test, such as printing a document, is awaiting a confirmation wherein confirmation takes place by verification of the user. Each user can have a communication tag 17 assigned in the form of a card. Verification is then done by placing the communication tag 17 in the vicinity of the communication receiver 18.

In yet another exemplary embodiment, the testing robot 2 further comprises a sensor 19 adapted for detecting a performed action. The sensor 19 can be a camera, photocell, motion sensor, noise sensor etc. The sensor 19 is used for detecting the performed action if its result cannot be seen on the display 4. For example, when the device 1 under test is a printer, the action can be printing a paper. A prompt for a user to print a document can be shown on the display 4 wherein the prompt can be confirmed either by pressing the action element 7 or by placing the communication tag 17 near the communication receiver 18. After confirmation, the document is printed. This action, however, cannot be seen by the camera 11, as it is focused mainly on the display 4 of the device 1 under test, the printer. The printing itself can be detected by the sensor 19, for example if the sensor 19 is a camera, the printed paper is seen by the camera, or a movement is detected by a movement sensor, such as photocell, in a particular area where the document emerges from the printer.

The central control unit 3 may be in the exemplary embodiment a personal computer with at least a monitor and a PC mouse; as such, the central control unit 3 comprises a processor 20 and a memory unit 21. The central control unit 3 is used to control the whole process as described further in the application and ensures communication between itself and the testing robot 2. The device 1 under test may be separate and may work independently on the central control unit 3. However, the device 1 under test may be communicatively coupled to the central control unit 3 if the device 1 under test allows such connection.

In the exemplary embodiment, the device 1 under test is a printer. The scope of the invention is, however, not limited to printers, as the device 1 under test may be any other device with implemented embedded system 6 either with GUI 62 or other form of OUI 61. The OUI 61 may not comprise a touchscreen or even display 4, however, it can comprise another visual indicator 63, such as a LED or other form of light indication. The following list of devices is not limiting the scope of protection given by the claims. Devices which comprise a touchscreen may be a printer, tablet, smartphone, control panel for industrial use, cash registers, information kiosks, ATMs, terminals, smart home gadgets etc. Devices only with a display 4 not embodied as a touchscreen may be a microwave, radio, calculator, any of the devices named in the previous list etc.

Descriptor Constructing

For characterization of the image, a numerical value is used. These numerical values stored in vector format are called descriptors and can provide information about the color, texture, shape, motion, and/or location of the image. It is clear that to describe an image in more detail, a more specific descriptor needs to be used. Descriptors come in various shapes and lengths and provide different numerical or verbal description of the processed image. For example, a descriptor providing information about color distribution in the image will have different numerical value, length and shape than a descriptor providing information about the shape of the image, as the color distribution can be described by one alphanumerical value with an information about the average color of the image, such as #FF0000, #008000, #C0C0C0 etc., and the shape can be described by a vector having two numerical values—length and width of the image. Another descriptor can be used to describe average color and shape of the image. This descriptor could be represented by a vector with three values, one providing an information about the color and two about the size. The method of constructing a descriptor according to an exemplary embodiment of the present invention is described in the FIG. 5 and the following text.

An image 50 of the device 1 under test comprises a region of interest, such as a control panel 60. The image 50 is cropped so that only the region of interest containing relevant information is shown in the cropped image 51, the region of interest is preferably the OUI 61. Cropping is used to remove any part of the image, which is not relevant for further processing, as it does not contain useful information to make the image-processing part of the method faster. In the preferred embodiment, the descriptor is used to describe an image of the OUI 61 of various devices with display. As the optical sensor 11 captures an image, a portion of the device 1 under test, where the display 4 is placed, can be seen too. Since the image of the device 1 under test itself does not carry relevant information, it can be removed from the picture without a loss of important information. To make the process of finding the region of interest easier, various marks 54 can be placed on the device 1 under test to highlight the position of the region of interest. An example of highlighting the region of interest of the image can be seen from the FIGS. 2-4. In these figures, the front panel of the device 1 under test provided with the display 4 is shown. Usually, the display 4 is of a rectangular shape. To highlight the position of the OUI 61 on the device 1 under test, a set of marks 54 placed in the corners of the rectangle forming the OUI 61 can be arranged. With these marks 54, it is easier for an image processing unit 13 to determine the position of the region of interest faster and with better accuracy. After only the region of interest is cropped from the original image 50, the region of interest is converted into a binary edge image. In this format, pixels forming the image can achieve only two values −0 and 1, marking either a black or a white pixel, respectively. Generally, before this step, the image 50 is converted into a grayscale image. Depending on the average intensity of the pixel, a threshold value of the pixel intensity is chosen. The pixels with value lower than the threshold value are then converted to a black pixel, whereas the pixels with value higher than the threshold value are converted to a white pixel. The threshold value is not constant for every processed image, it rather changes with the overall quality of the image and conditions of the surroundings. Binary edge image is then divided into rows and columns, wherein the maximal value of rows and columns is given by the size of an image in pixels, e.g. image of the format 640×480 could be divided up to 640 rows and 480 columns etc. Other embodiments of the method propose dividing the image into another number of rows and columns. However, with the decreasing number of the divided rows and columns, the informational value of the descriptor decreases rapidly too. In the next step, two histograms are created. The first histogram counting the number of non-zero value pixels in each row, the second histogram counting the number of non-zero value pixels in each column. Both of these histograms are normalized and after this step, two sets of numbers are available. The first set of numbers contains numbers representing a normalized histogram of non-zero value pixels in each row, the second set of numbers contains numbers representing a normalized histogram of non-zero value pixels in each column. These two sets of numbers are the first two values of the constructed descriptor.

Figure 5:
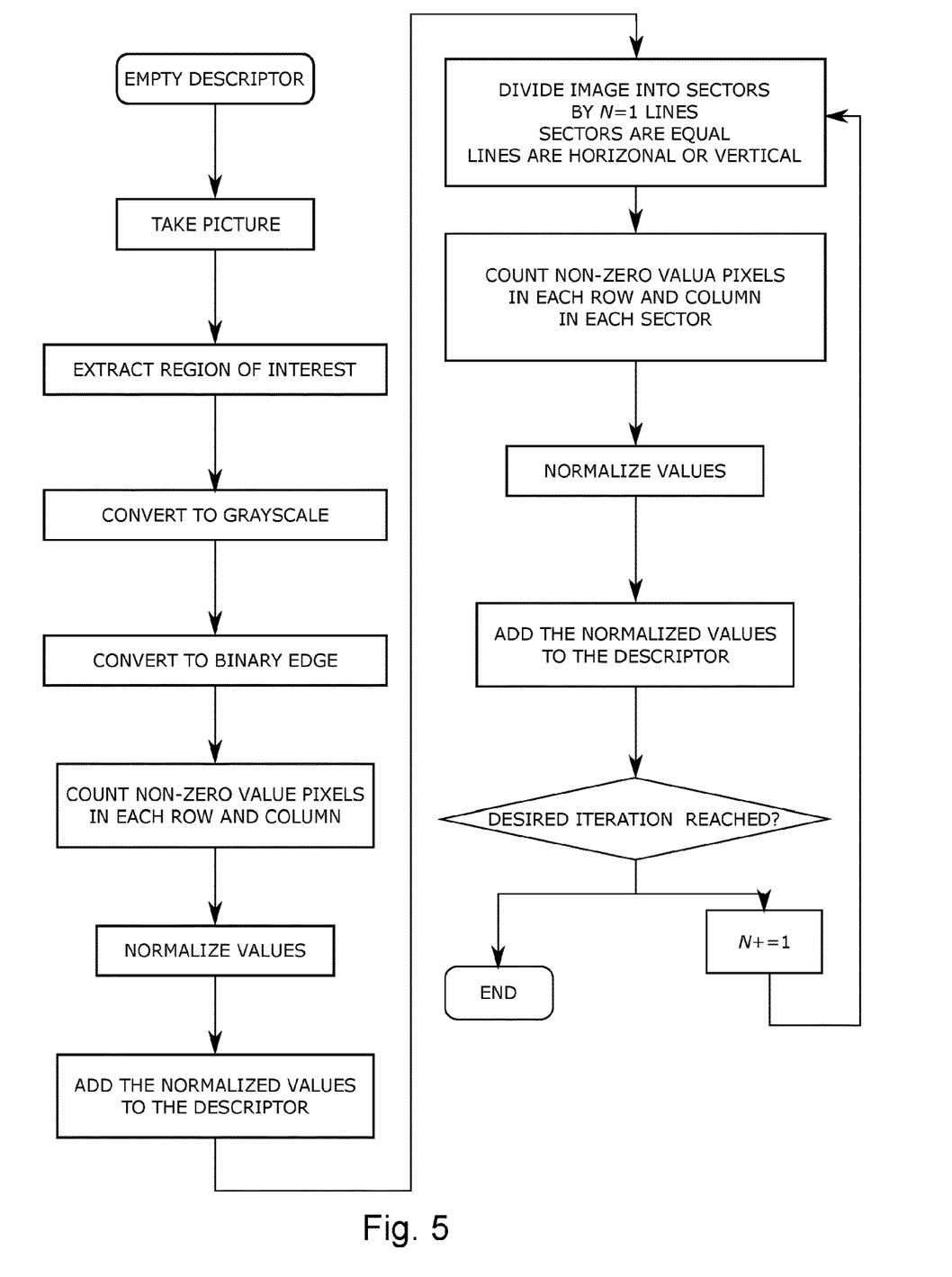
FIG. 5—shows a method of constructing a descriptor.
Figure 6A:
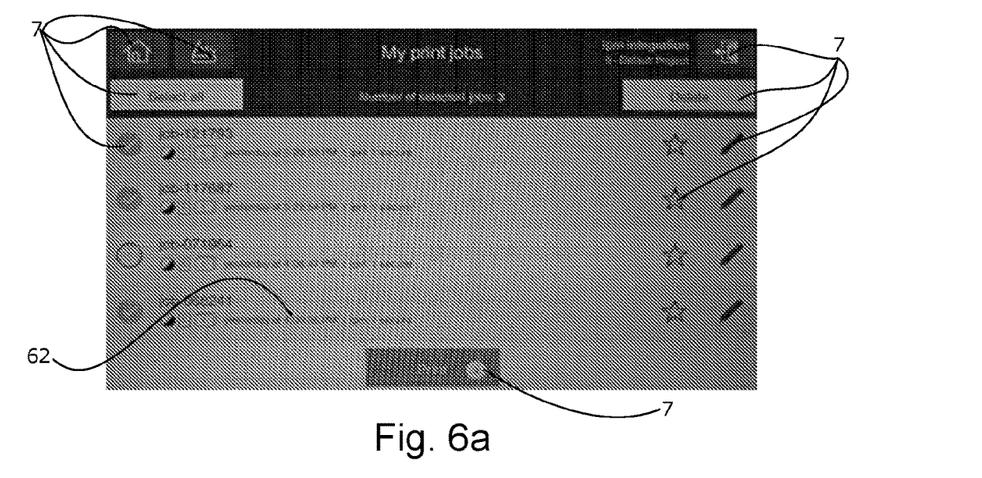
FIG. 6—shows a processing of an image.
Figure 6B:
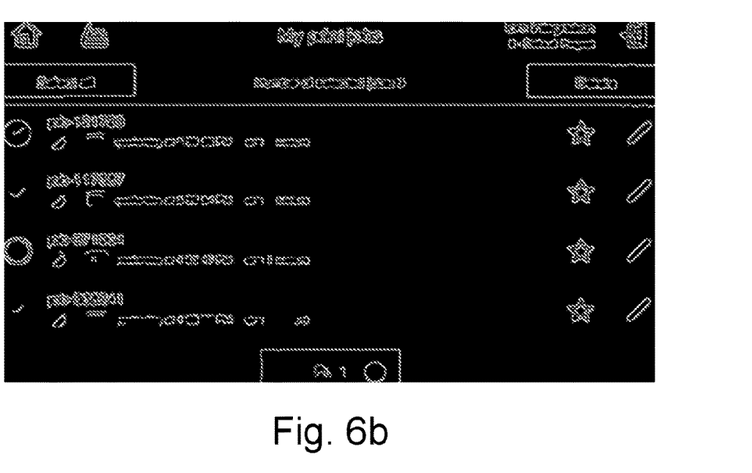
Figure 6C:
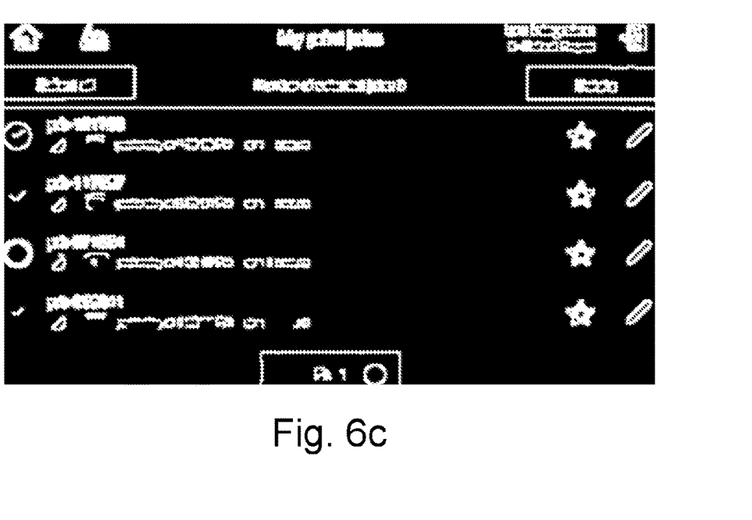
Figure 7:
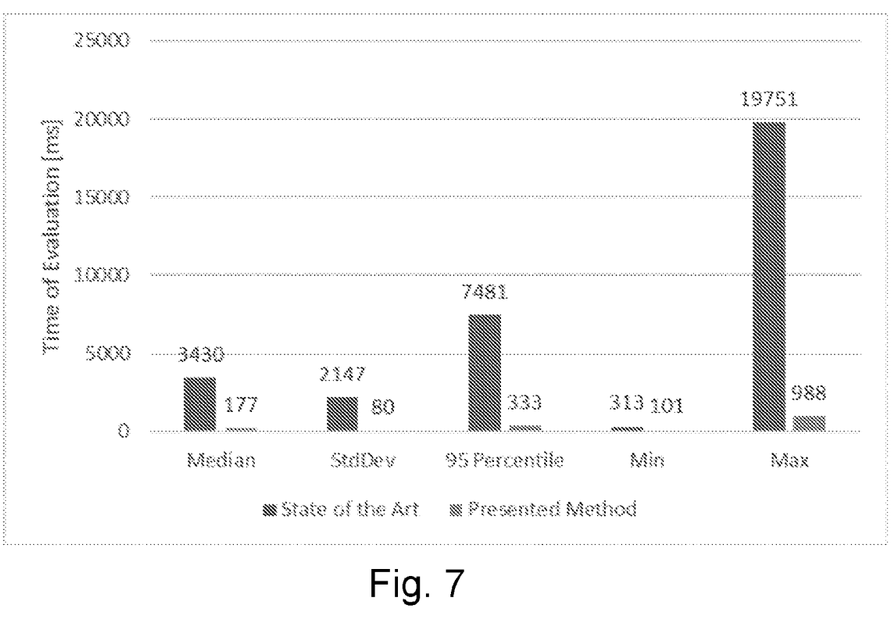
FIG. 7—shows comparative results of the Time of evaluation obtained by a presented method and State of the Art method.

In the next step, the cropped image 51 is divided with a vertical dividing line 52 into two halves—left and right. The halves need not to be of the same size, however, it is recommended to do so, and a preferred embodiment of the method works with the halves of the same size. Yet again, the left half and the right half are divided into columns, wherein the total number of columns is the same as the number of columns in the undivided image. Next, a histogram representing the number of non-zero value pixels in the columns of the first half is constructed and normalized. Then, a histogram representing the number of non-zero value pixels in the columns of the second half is constructed and normalized. These two steps are interchangeable, meaning it does not matter which histogram is created first.

In the next step, the cropped image 51 is divided with a horizontal dividing line 52 into two halves—top and bottom. The halves need not to be of the same size, however, it is recommended to do so, and a preferred embodiment of the method works with the halves of the same size. Yet again, the top half and the bottom half are divided into rows, wherein the total number of rows is the same as the number of rows in the undivided image. Next, a histogram representing the number of non-zero value pixels in the rows of the first half is constructed and normalized. Then, a histogram representing the number of non-zero value pixels in the rows of the second half is constructed and normalized. These two steps are interchangeable, meaning it does not matter which histogram is created first. Furthermore, it does not matter whether the image is first divided with a vertical line or a horizontal one.

After completing the steps described in the previous two paragraphs, one should have four more sets of numbers available. The first set of numbers contains numbers representing a normalized histogram of non-zero value pixels in the columns of the left half of the image, the second set of numbers contains numbers representing a normalized histogram of non-zero value pixels in the columns of the right half of the image, the third set of numbers contains numbers representing a normalized histogram of non-zero value pixels in the rows of the top half, and the fourth set of numbers contains numbers representing a normalized histogram of non-zero value pixels in the rows of the bottom half. These four sets of numbers are then added to a descriptor, which now has the total of six values—sets of numbers. The order of the sets of numbers in the descriptor is irrelevant. However, all the descriptors must have the same form, thus the order of the sets of values must be the same for every descriptor constructed.

In the preferred embodiment, additional sets of numbers are constructed in accordance with the process described above. In the next step, the cropped image 51 is divided with two vertical dividing lines 52 into three thirds—left, middle, and right. The thirds need not to be of the same size, however, it is recommended to do so, and a preferred embodiment of the method works with the thirds of the same size. Yet again, the left third, the middle third and the right third are divided into columns, wherein the total number of columns is the same as the number of columns in the undivided image and the image divided in two halves. Next, a histogram representing the number of non-zero value pixels in the columns of the left third is constructed and normalized. Then, a histogram representing the number of non-zero value pixels in the columns of the middle third is constructed and normalized. Then, a histogram representing the number of non-zero value pixels in the columns of the right third is constructed and normalized. These three steps are interchangeable, meaning it does not matter which histogram is created first.

In the next step, the cropped image 51 is divided with two horizontal dividing lines 52 into three thirds—top, middle, and bottom. The thirds need not to be of the same size, however, it is recommended to do so, and a preferred embodiment of the method works with the thirds of the same size. Yet again, the top third, the middle third and the bottom third are divided into rows, wherein the total number of rows is the same as the number of rows in the undivided image and the image divided in two halves. Next, a histogram representing the number of non-zero value pixels in the rows of the top third is constructed and normalized. Then, a histogram representing the number of non-zero value pixels in the rows of the middle third is constructed and normalized. Then, a histogram representing the number of non-zero value pixels in the rows of the bottom third is constructed and normalized. These three steps are interchangeable, meaning it does not matter which histogram is created first.

After completing the steps described in the previous two paragraphs, one should have six more sets of numbers available. The first set of numbers contains numbers representing a normalized histogram of non-zero value pixels in the columns of the left third of the image, the second set of numbers contains numbers representing a normalized histogram of non-zero value pixels in the columns of the middle third of the image, the third set of numbers contains numbers representing a normalized histogram of non-zero value pixels in the columns of the right third of the image, the fourth set of numbers contains numbers representing a normalized histogram of non-zero value pixels in the rows of the top third of the image, the fifth set of numbers contains numbers representing a normalized histogram of non-zero value pixels in the rows of the middle third of the image, and the sixth set of numbers contains numbers representing a normalized histogram of non-zero value pixels in the rows of the bottom third of the image. These six sets of numbers are then added to a descriptor, which now has the total of twelve values—sets of numbers. The order of the sets of numbers in the descriptor is irrelevant. However, all the descriptors must have the same form, thus the order of the sets of values must be the same for every descriptor constructed.

One could continue analogically and further divide the image into quarters, fifths etc. to the maximum applicable division number being the lower number of the size of the image in pixels. Given that the division order is N, it is clear that by division we create 2N new histograms to be added to the descriptor. The preferred embodiment of the method divides the image to up to three parts, however, the number of divisions is not limiting the subject of the invention.

Descriptors constructed according to the method described in the paragraphs above are further used to identify an image. In the preferred embodiment, the method for constructing a descriptor can be implemented either in the testing robot 2 or the central control unit 3. Implementation is primarily performed in a software form, meaning that the testing robot 2 or the central control unit 3 have a software installed thereon, wherein the purpose of the software is to create a descriptor of a given image. As an input, the software receives an image and the output of the software is a descriptor of the given image. For example, the image processing unit 13 receives an input in the form of an image 50 captured by the camera 11, wherein a part of the image 50 forms a region of interest, such as a display 4 of a device 1 under test, or the OUI 61. The image 50 is further cropped so that only the region of interest is in the cropped picture. Then a descriptor is constructed using the method described above and stored in the memory unit 14. The output of the image processing unit 13 is, therefore, the descriptor of the inputted cropped image 51.

As each of the sets of numbers represents a number of non-zero value pixels in a row or a column of a given sector, the opposite method of constructing the descriptor of the image is also applicable. The opposite method works with a number representing zero value pixels as opposed to using a number of non-zero value pixels. As both methods provide equal results the scope of the invention is not limited to using only one of them.

Furthermore, counting only non-zero value pixels also represents zero value pixels, as the total number of pixels in each row or column is given by a sum of these two numbers, the mutual relationship of these two numbers can be given by simple formulas $N_0=N-N_1$ and $N_1=N-N_0$, where $N_0$ is the number of zero value pixels, $N_1$ is the number of non-zero value pixels and N is the total number of pixels in given row or column.

In a preferred embodiment, the cropped image 51 is divided into so called sectors 53 using the horizontal or vertical dividing lines 52. The sectors can be halves, thirds, quarters etc., of the cropped image 51 and should be of the same size. Each sector 53 comprises lines and rows of pixels forming the cropped image 51. The rows and columns may be further divided into groups, wherein the group consists of at least one row or column. The histogram is then counted for each group of each sectors.

Image Classification

The embedded system 6 of the device 1 under test uses the display 4 to show the user information about task progress, state of the device, options, settings etc. in the so called Graphical User Interface (GUI) 62. The user can interact with the user interface, wherein the feedback of the embedded system 4 is usually shown in a form of a screen on the GUI 62. The user interface should comprise input elements, such as buttons 5, touchpad, trackpoint, joystick, keyboard etc. to receive input from the user. Should the display 4 of the device 1 under test be a touchscreen, it may also comprise the action elements 7 implemented in the GUI 62. Touching the input element or the action element 7 should result in a feedback of the device 1 under test and an action may be performed, screen on the display 4 can be changed, the device 1 under test can be turned on or shut down etc. For further use, all possible screens, states of the visual indicators 63, current settings etc. make up the states of the device 1 under test. Changing of the screen shown in the GUI 62, lighting up the visual indicator 63, performing an action etc. mean that the state of the device 1 under test has been changed.

Screens showed on the display 4 of the user interface can be sorted into classes describing their purpose or meaning, e.g. title screen showing a logo of a company with a loading bar, login screen asking the user to put in credentials, error screen informing the user about failing a task, screen with a list of tasks, operations available to the user, screen showing settings of the test device, language options, list of information about the state of the device etc. Some of these screens can be shown in various forms with only slight differences between them, such as login screen with empty slots for username and password, partially filled with only a username, or fully filled. As the username and password for various users can have different lengths, the screens with filled in credentials can differ subtly. For the purpose of testing the device 1 under test, the differences between these pictures should be noted but may not play a significant role. However, testing system should also note that these pictures are similar, and all belong to the same class—login screen. Another example of similar screens belonging to the same class may be following. A list of tasks to be performed can be shown on the display of the test device. Should the device be a printer, for example, the task list can show a queue of documents to be printed, their order, size, number of pages etc. Task list can change its form depending on the number of tasks to be performed, some of the tasks may be selected to be deleted from the queue and as such, they can be highlighted, or a "selected" symbol can appear in their vicinity. The testing system should note that these pictures are similar, and all belong to the same class—task list screen.

All possible screens of the GUI 62 displayed on the display 4 that need to be recognized should be manually assigned to classes by a person. This way, it is ensured that all the images of the screens are assigned to the correct class. In this step, an authorized person should review as many images of the GUI 62 screens as possible to cover all classes which will be used for sorting the screens of the GUI 62. During manual sorting, the authorized person can be prompted to mark and highlight action elements 7 on the screen which are they assigning to a class. In this step, the authorized person manually marks a position and size of the action element 7 and assigns an action to this action element 7. The action refers to the instruction the action element 7 passes to the embedded system 6. The action element 7 can thus be e.g. an OK button confirming an action performed by a user. Another example of an action element 7 can be a "Log In" button confirming user's credentials and logging them into the system. Further examples of the action elements 7 can be cancelling button, close window button, sign up button, confirm action button, each task can operate as an action element 7, arrow buttons for navigating around the GUI, or any text field etc. When assigning a screen to a class, it is thus necessary to mark all action elements 7 in the screen and assign an action to be performed to each of the action elements 7. The action may lead to closing window, logging up, changing the screen, selecting a task to be performed, etc. It is therefore possible to change screens by pressing an action element.

In a preferred embodiment of the invention, the display 4 of the device 1 under test is placed on the control panel 60 of the device 1 under test. Device 1 under test comprises the embedded system 6 adapted to receive user input in form of instructions via action elements 7 implemented in the touch-screen, or via interactive elements, such as the buttons 5. The user uses the action elements 7 and interactive elements to interact with the device 1 under test, to perform tasks.

In a preferred embodiment, at least one screen has a connection to at least one other screen meaning that upon interaction with the action element 7 or the interaction element, the original screen is transferred into the following screen to which it is connected. There are some screens with no action elements 7 assigned which thus have no connection to any other screen. This screen may for example be a loading screen, welcoming screen after the device 1 under test is turned on, or shutdown screen after the device 1 under test is shut down.

Each class of screens can thus contain many more screens in their variety or with subtle changes as discussed above.

In another embodiment of the present invention, the device 1 under test may not comprise a touchscreen or GUI 62 which requires a user-device interaction. The feedback to the user is provided rather by visual indicators 63 such as LED, LCD panel etc. In this case, the device 1 under test may be situated in a plurality of states. The states of the device 1 under test include the actions being performed by the device 1 under test, its informational feedback, its current setting etc. For example, should the device 1 be an oven, see FIGS. 4a and 4b, the control panel 63 includes two knobs 64, first knob 64 adapted to change the mode of the oven (turned on, grill, heating up, heating down, hot air mode etc.), the second knob 64 adapted to change the temperature settings, two visual indicators 63, the first indicating whether the oven is turned on, the second indicating whether the heating is on or off, in other words whether the desired temperature is reached. The oven may further comprise a display 4 with clock and two buttons 7 used to set the timer of the oven, time of the clock, etc. The selected mode, the current setting being set, the set temperature, state of the visual indicators 63 make up all the possible states of the oven. The oven is in a first state when it is shut down. By rotating the knob 64 the user selects the operational mode of the oven and thus changes the state of the oven, this is usually accompanied by switching on the first visual indicator 63. By rotating the second knob 64, the user sets a desired temperature and thus changes the state of the oven, this is usually accompanied by switching on the first visual indicator 63, see FIG. 4b. It is thus necessary to obtain pictures of all possible states of the oven, localize buttons 7 or knobs 64 and assign them a function which changes the state of the oven to another state. The pictures are then assigned a descriptor and classified.

Decision-Making Module

The central control unit 3 comprises a decision-making module 22, preferably embodied as a neural network. The decision-making module 22 is implemented in the central control unit 3 in a software form. The decision-making module 22 comprises a trained classifier. The classifier is trained on a dataset comprising either a set of descriptors of classified images of states of the device 1 under test, or classified images of states of the device 1 under test, or a set of descriptors of classified images of states of the device 1 under test together with classified images of states of the device 1 under test.

As described above, all possible states of the device 1 under test are manually identified and sorted into classes. Each of the states is assigned a descriptor according to the method described above. To create even larger dataset for training of the classifier of the decision-making module 22, the images of the screens can be captured in various conditions, such as—lighting, size, angle of the camera 11 with respect to the device 1 under test, display 4 brightness, contrast, sharpness of the image etc. Images of the same state of the device 1 under test obtained in various conditions form a batch. For every classified image of the state of the device 1 under test, the identifying descriptor is created and assigned. It is obvious that the descriptors for images of a given batch will be similar, but not the same, as the image was obtained in different conditions.

The classifier is then trained on a dataset comprising either the descriptors of the sorted images of states of the device 1 under test, the images of states of the device 1 under test, or the combination of both. The bigger the training dataset is, the more accurate is the trained classifier. After training, the classifier is prepared to sort images or descriptors into given classes. In the sorting process, the classifier takes as an input an image of the state of the device 1 under test or a descriptor of the given image and is able to assign the image or the descriptor to a right class. Unfortunately, the classifier is not 100% accurate. To improve the accuracy of the classifier, it is recommended to enlarge the training dataset by capturing one image of a given state of the device 1 under test in various conditions, such as: display brightness, color contrast, lighting conditions, angle and distance of the camera from the display etc. These images are depicting the same states of the device 1 under test. When cropped, their informational value will be the same even though the images themselves are a little different. For that reason, the descriptors of these images will be a little different too. This way, after the training of the classifier is performed, it will classify the images of the screen more accurately.

Method for Testing an Embedded System

The method for testing the embedded system 6 of the device 1 under test comprises a number of the following steps. First, a set of images depicting at least two states of the device 1 under test is created. This set of images is then saved in a memory unit 21 of the central control unit 3. In a preferred embodiment, the set of images comprises every possible state of the device 1 under test. For at least one state of the device 1 under test, at least one action element 7 and connecting to at least one other state of the device 1 under, test is assigned. Connecting is applied when the action element 7 of the current state of the device 1 under test or a button 5 is pressed. After pressing, the current state of the device 1 under test changes to another state of the device 1 under test to which the initial one is connected. An identifying descriptor is then assigned to each of the images of the state of the device 1 under test. The descriptor is a numerical value, preferably a set of numerical values in vector form, describing the current state of the device 1 under test. The descriptor of the state may vary a little depending on the current conditions under which the image was obtained. In general, the descriptors of different states of the device 1 under test are different and should not be interchanged.

In the next step, an image of the device 1 under test is captured with the camera 11 of the testing robot 2. The photo taken by the robot 2 is cropped so that only a picture of the OUI 62 itself is shown. The image is then saved and stored in the memory unit 14 of the testing robot 2 or in the memory unit 21 of the central control unit 3. A current descriptor is then assigned to the image of the stored state and compared with the identifying descriptors stored in the memory unit 21 of the central control unit 3. In the preferred embodiment, the comparison process is performed by decision-making module. The current descriptor of the current image of the device 1 under test is used as an input for the neural network and as an output, the current state of the device 1 under test is determined with certain accuracy. As the current descriptor of the obtained image depicting the current state of the device 1 under test will be a little different than the identifying descriptor associated with the state of the device 1 under test that is saved in the central control unit 3, the direct comparison will be less effective and accurate than using the neural network. After the current state of the device 1 under test is determined, the position of the action element 7 on the display 4 or the button 5 on the control panel 60 is determined and the effector 10 is moved so that the action element 7 or the button 5 is pressed.

The method for testing the embedded system 6 of the device 1 under test can be further used to measure response time and reaction time of the embedded system 6. When the action element 7 or the button 5 of the current state of the device 1 under test is pressed, the time measuring is initiated. Once the screen on the display 4 or the state of the device 1 under test in general is changed the time measuring is ended, and the value of the time passed is stored in the memory unit 21 of the central control unit. Afterwards, the state of the device 1 under test can be determined. This way, one can measure the time the embedded system 6 takes to perform various operations, such as time required for changing of various screens on the GUI 62 or changing of the states of the device 1 under test.

The testing robot 2 can further comprise a sensor 19 such as a motion sensor, heat sensor, noise sensor, or an additional camera. This sensor 19 is adapted to detect whether an action was performed. In the preferred embodiment, the device 1 under test is a printer. The action can thus be printing of a document. The sensor 19 is then used to detect whether the document was printed. For example, a camera or a motion sensor is placed to monitor the area to which the printed document is placed, upon detecting the movement it is clear that the document was successfully printed. This can be used for measuring the time-to-print. In this embodiment of the method, the user is prompted to confirm the printing action via the GUI 62. In other words, the screen with printing instruction is shown on the display 4. This instruction can be confirmed manually, by pressing the action element 7 associated with confirming the action, such as an OK button.

In another embodiment, the device 1 under test may be an oven, wherein the sensor 19 may be a heat sensor placed inside the oven. The testing robot 2 gives the oven a task to heat up to e.g. 200° C. which changes the state of the oven by lighting up the visual indicator. When the oven reaches the required temperature, the sensor 19 sends an information about the performed action to the testing robot 2. It is clear that the above-mentioned examples are just illustrative and do not limit the scope of the invention just to printers and ovens.

In another embodiment, the robot 2 comprises a second robot arm 16 provided with a communication tag 17 such as card or chip based on the RFID or NFC communication protocol. The printer or other device 1 under test then further comprises a communication receiver 18 which is adapted to communicate with the communication tag 17. The confirming of the action can then be performed by putting the communication tag 17 in the vicinity of the communication receiver 18. Once the action is confirmed by either of the methods described in this paragraph, time measuring is initiated. As the action in the example is printing a document, the document is printed and detected by the sensor 19. Upon detection, the time measuring is ended, and the measured time value is stored either in the memory unit 14 of the robot 2 or the memory unit 21 of the central control unit 3.

LIST OF REFERENCE SIGNS

1—device under test
2—testing robot
3—central control unit
4—display
5—button
6—embedded system
7—action element
8—processor
9—computational memory
10—effector
11—camera
12—processor
13—image processing unit
14—memory unit
15—first robot arm
16—second robot arm
17—communication tag 18—communication receiver
19—sensor
20—processor
21—memory unit
50—image
51—cropped image
52—dividing line
54—marks
60—control panel
61—Observable User Interface (OUI)
62—Graphical User Interface (GUI)
63—visual indicator
64—knob

The invention claimed is:

1. A method for testing an embedded system of a device, the method comprising the steps of:
   (a) creating a set of images depicting at least two states of an observable user interface (OUI) of a device under test and storing the set of images in a memory unit of a central control unit,
   (b) assigning at least one action element or a button to at least one image of the state of the OUI from the set of images,
   (c) assigning an identifying descriptor to each image of the states of the OUI,
   (d) acquiring an image of the OUI of the device under test by a camera,
   (e) assigning a current descriptor to the acquired image,
   (f) determining the current state of the OUI of the device under test by comparing the identifying descriptors and the current descriptor,
   (g) locating the at least one action element or the button, and
   (h) moving an effector of the testing robot to the action element or the button and interacting with the action element or the button,
   wherein to obtain the descriptors,
      a region of interest is cropped from the image, a threshold value is chosen, the threshold value depending on the average intensity of the pixels, wherein the pixels having a lower value than the threshold value are converted to a black pixel and the pixels with value higher than the threshold value are converted to a white pixel, and
      the cropped and converted image is divided to a number of sectors, wherein the sectors are groups of columns or rows of the image, wherein the number of sectors is larger than one and equal to or smaller than an equivalent dimension of the image, and
      wherein the descriptor contains at least two sets of numbers comprised of a first histogram counting the number of non-zero value pixels in each row and a second histogram counting the number of non-zero value pixels in each column, wherein the histograms are normalized.

2. The method according to claim 1, wherein the central control unit further comprises a decision-making model, wherein the decision-making model is adapted to determine the current state of the OUI using the identifying descriptors and the current descriptor.

3. The method according to claim 2, wherein the decision-making model is realized as a neural network comprising a classifier learned on a dataset consisting of the images of the state of the OUI and the assigned identifying descriptor.

4. The method according to claim 2, wherein an input of the decision-making model is the acquired image of the state of the OUI and an output of the decision-making model is an assignation of the current state of the device under test to one of the stored states of the device under test.

5. The method according to claim 1, wherein by interacting with the action element or the button of the current state of the device under test, time measuring is initiated, the state of the device under test is changed to a new state of the device under test, the time measuring is completed and the new state of the device under test is determined.

6. The method according to claim 1, wherein the time interval between the states of the device under test is stored in the memory unit of the central control unit.

7. The method according to claim 1, wherein by interacting with the action element or the button of the current state of the device under test, time measuring is initiated and an action is initiated, wherein upon detecting the action performed by an action sensor, the time measuring is completed.

8. A method of identifying a state of the device comprising a steps of:
   (a) capturing an image of the observable user interface (OUI) using an image sensor,
   (b) converting the image into a binary edge format having the pixels of the value either 0 or 1,
   (c) dividing the converted image into a plurality of rows and/or columns,
   (d) creating a first set of numbers representing a number of non-zero value pixels in each row and a second set of numbers representing a number of non-zero value pixels in each column,
   (e) assigning the first set of numbers and the second set of numbers to an empty descriptor,
   (f) determining the current state of the OUI of the device under test using the identifying descriptor and the current descriptor,
   (g) locating the at least one action element or the button, and
   (h) moving an effector of the testing robot to the action element or the button and interacting with the action element or the button.

9. The method of identifying a state of the device according to claim 8, further comprising the steps of:
   dividing the image into a number of sectors along at least one line wherein the sectors are of the same size,
   dividing the sectors into at least one group containing a plurality of rows and/or columns,
   for each group, creating a first subset of numbers representing a number of non-zero value pixels in each row of a given sector and a second subset of numbers representing a number of non-zero value pixels in each column of a given sector, and
   assigning the subsets of numbers to the descriptor.

10. The method of identifying a state of the device according to claim 9, wherein the lines dividing the image are horizontal and/or vertical.

11. The method of identifying a state of the device according to claim 8, wherein the number of groups is equal to or higher than one and equal to or lower than the height or width of the converted image in pixels.

12. The method of identifying a state of the device according to claim 8, wherein the sets of numbers and the subsets of numbers are normalized.

13. A system for testing an embedded system of a device according to the method of claim 8, the system comprises at least a device under test, a testing robot, and a central control unit,
   wherein the device under test comprises at least an observable user interface (OUI) adapted to show a state of the device under test and provided with at least one action element and/or button and/or visual indicator, the device under test further comprising an embedded system, wherein the action elements and the buttons are adapted to interact with the embedded system, and wherein the central control unit comprises at least a memory unit comprising a database of images of all states of the OUI, wherein at least one of the states comprises the action element or the button with the assigned function, and the testing robot comprising at least an effector adapted for interacting with the device under test, a camera, and an image processing unit.

* * * * *